(12) United States Patent
Schmidt et al.

(10) Patent No.: US 9,408,487 B2
(45) Date of Patent: Aug. 9, 2016

(54) INTERCHANGEABLE KITCHEN UTENSIL

(71) Applicants: Jared Schmidt, Westwood, NJ (US);
Jordan M. Schmidt, Westwood, NJ (US)

(72) Inventors: Jared Schmidt, Westwood, NJ (US);
Jordan M. Schmidt, Westwood, NJ (US)

( * ) Notice: Subject to any disclaimer, the term of this patent is extended or adjusted under 35 U.S.C. 154(b) by 0 days.

(21) Appl. No.: 14/311,850

(22) Filed: Jun. 23, 2014

(65) Prior Publication Data

US 2015/0366387 A1    Dec. 24, 2015

(51) Int. Cl.
*A47G 21/10*    (2006.01)
*A47J 43/28*    (2006.01)

(52) U.S. Cl.
CPC .............. *A47G 21/10* (2013.01); *A47J 43/283* (2013.01)

(58) Field of Classification Search
USPC .............. 294/28, 117, 118, 99.2, 8.5, 11, 16, 294/65.5, 106
See application file for complete search history.

(56) References Cited

U.S. PATENT DOCUMENTS

| 790,329 | A | * | 5/1905 | Taylor | 24/515 |
| 2,120,148 | A | * | 6/1938 | Kallmann | 294/28 |
| 2,561,374 | A | * | 7/1951 | Igoe | 30/324 |
| 2,643,151 | A | * | 6/1953 | Zupancic | 294/118 |
| 3,841,684 | A | * | 10/1974 | Fleishman | 294/1.3 |
| 4,530,536 | A | * | 7/1985 | Williams | 294/118 |
| 6,152,505 | A | * | 11/2000 | Coyne | 294/16 |
| 7,448,660 | B2 | * | 11/2008 | Yamanaka et al. | 294/16 |
| D592,918 | S | * | 5/2009 | Lion et al. | D7/686 |
| D593,382 | S | * | 6/2009 | Lion et al. | D7/686 |
| 8,308,208 | B1 | * | 11/2012 | Blum | 294/16 |
| 2007/0284795 | A1 | * | 12/2007 | Lancaster-Larocque | 269/8 |
| 2010/0052347 | A1 | * | 3/2010 | Teng | 294/99.2 |

* cited by examiner

*Primary Examiner* — Paul T Chin
(74) *Attorney, Agent, or Firm* — Tutunjian & Bietto, P.C.

(57) ABSTRACT

A plurality of discrete tong members that are configured to be easily and securely conjoined and releasably fastened to each other in order to provide an interchangeable pair of interlocked tongs. The tong members have proximal ends which include releasable fastening means and distal ends having a gripping surface. Each tong member has a slot and the tong members are configured to receive a slot of another tong member in order to position the tong members in a conjoined relationship with each other. The releasable fastening means fasten the distal ends of conjoined tong members to each other. The tong members have flexible, resilient portions such that when the pair of tong members are in an interlocked relationship, the slot portions form a fulcrum and the portions from the slot to the distal ends are configured to be urged towards each other and then return to its original position.

11 Claims, 3 Drawing Sheets

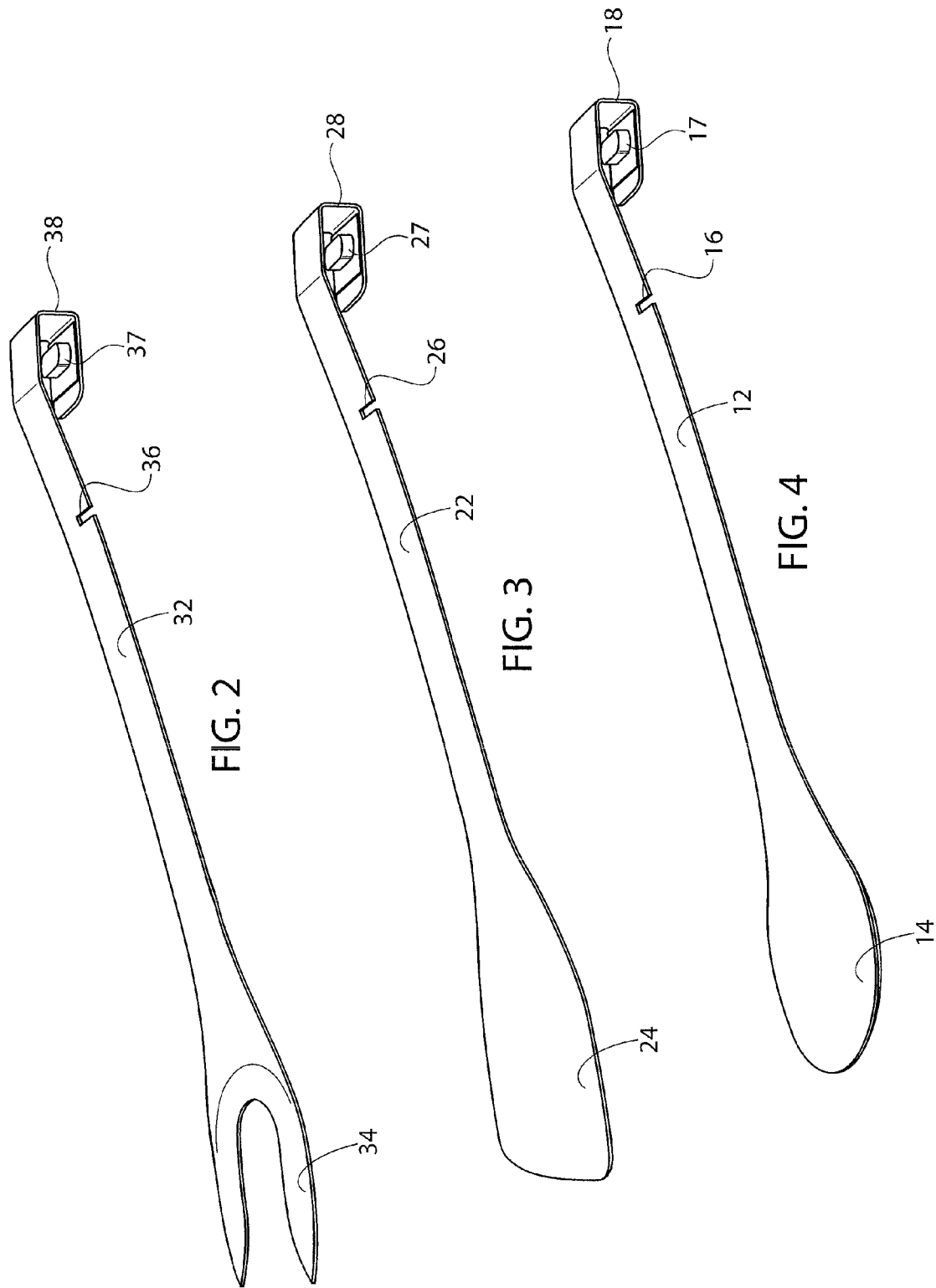

INTERCHANGEABLE KITCHEN UTENSIL

BACKGROUND

1. Technical Field

The present invention generally relates to kitchen utensils. More particularly, it relates to kitchen tongs.

2. Description of the Prior Art

Tongs are popular kitchen utensils generally used for gripping and lifting various food items in the preparation and serving of meals. Tongs known in the art have two elongate tong members that are permanently affixed to each other. Some known tongs have a general scissor-like configuration wherein the tong members are joined at a pivot point at a middle portion of the tong members. The pivot point typically comprises a pivot screw and screw nut. The proximal end of the scissors-like tongs is in the form of handles which allow the user to manipulate the tongs while the distal end includes a gripping portion in order to grip food items. Another known tong configuration features the proximal ends of each tong member being fixedly secured to each other in an adjacent relationship wherein biasing springs force the tong members apart.

The gripping portions on the distal ends of known tongs may comprise a fork-like body, spatula-like body, spoon-like body, or have various other shapes known in the art. A disadvantage with known tongs is that the tong members are permanently affixed to each other and one or both gripping surfaces on the pair of tongs are unable to be changed. However, a variety of gripping surfaces are needed for a pair of tongs depending on the size, weight, shape and texture of the food. Tongs that are desirable for handling food items such as salads traditionally include a tong member with a spoon-like gripping end and the other tong member has a fork-like gripping end. In contrast, tongs useful for gripping and lifting items such as meats may require flat, spatula-like and/or forked ends. Therefore, since the gripping portions of known tongs are not interchangeable a person is required to purchase numerous pairs of tongs having different gripping surfaces.

Furthermore, the continued performance of known tongs are dependent on the integrity of hardware such as pivot screws and pivot nuts and/or springs which normally degrade over time and serve as a point of weakness for the securement of the tong members to each other and decrease the lifespan of the tongs.

Accordingly, it is an object of the present invention to provide a plurality of tongs members with a variety of gripping portions that are easily conjoined and fastened to each other in order to form interchangeable tongs.

Yet another object of the present invention is to provide tong members that securely attach to each other in order to form a pair of interlocked tongs and requires minimal hardware for its operation.

It is another object of the present invention to provide tongs with improved performance that are cost effective to manufacture.

SUMMARY OF THE INVENTION

The present invention includes a plurality of discrete tong members that are configured to be easily and securely conjoined and releasably fastened to each other in order to form a kitchen utensil comprising a pair of interlocked tongs.

The tong members each have a generally elongate body having a proximal end which includes releasable fastening means, a gripping surface such as a spoon, fork or spatula on their distal ends and slots located on their bodies generally between the proximal and distal end. Each tong member is configured to receive the slot of another tong member in order to position the tong members in a conjoined relationship with each other. The releasable fastening means on the proximal ends of the tong members are then configured to fasten to each other in a secure manner in order to form an interlocked pair of tongs.

Each tong member has a flexible, resilient portion at least from its slot to the region near its distal end. When the pair of tong members are in an interlocked relationship, the slot portions form a fulcrum and the flexible, resilient portions from the slot to the distal ends are configured to be urged towards each other in order for the user to pick up food articles with the gripping surfaces of the tong members.

The tong members can be easily interchanged by releasing the releasable fastening means. For instance, if the releasable fastening means are magnets, the magnetic bodies may be pulled apart from each other and one of the tong members may be set aside. A new tong member is then configured to be conjoined and fastened to the existing tong member to form a new pair of interlocked tongs.

BRIEF DESCRIPTION OF THE DRAWINGS

The features and advantages of the present invention will be more readily understood from a detailed description of the exemplary embodiments taken in conjunction with the following figures:

FIG. 2 shows a perspective view of a discrete third tong member;

FIG. 3 shows a perspective view of a discrete second tong member;

FIG. 4 shows a perspective view of a discrete first tong member; and

DETAILED DESCRIPTION

The present invention includes a plurality of discrete tong members 12, 22, 32 that are configured to easily and securely be releasably fastened to each other in order to form a pair of tongs for use as a kitchen utensil.

Figure 1:
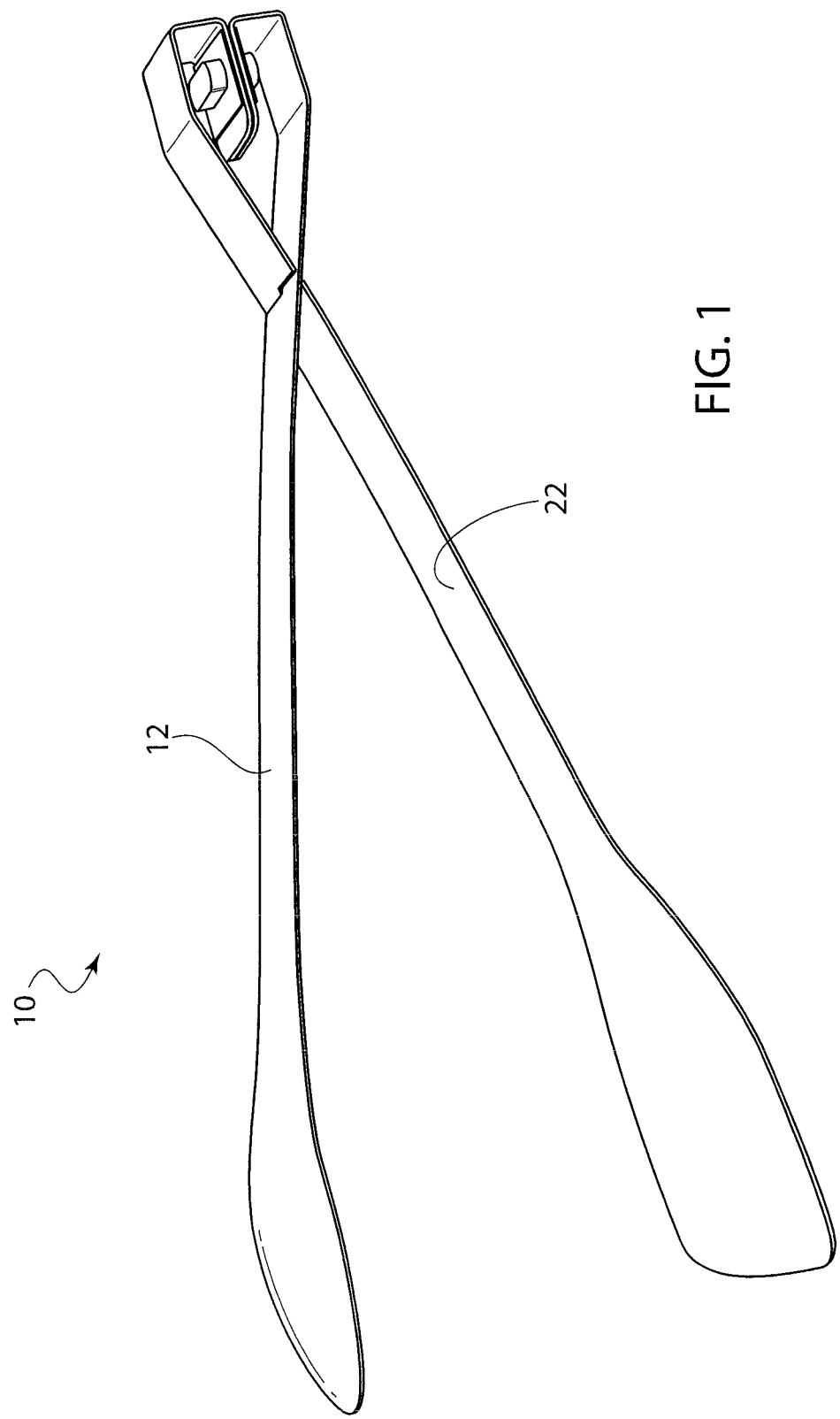
FIG. 1 shows a perspective view of the interlocked first and second tongs of the present invention.

FIG. 1 shows the interchangeable kitchen utensil 10 according to the present invention including first 12 and second 22 tong members. FIG. 4 shows a discrete first tong member 12. The first tong member 12 includes a generally elongate body having a proximal end 18 which includes releasable fastening means 17. The first tong member 12 also includes a gripping surface on its distal end 14. In the embodiment shown in FIG. 4, the gripping surface on the distal end 14 of the first tong member comprises a spoon.

FIGS. 2 and 3 show third tong member 32 and second tong member 22, respectively. The second and third tong members 22, 32 also feature generally elongate bodies having proximal ends 28, 38 which include releasable fastening means 27, 37 and distal ends 24, 34 having gripping surfaces. The gripping surfaces on the distal ends 24, 34 of second and third tong members are a spatula and fork, respectively.

The tong members 12, 22, 32 each have a slot 16, 26, 36 located on their body generally between the proximal and distal end. In the embodiments shown in FIGS. 1-5, the slots 16, 26, 36 are positioned closer to the proximal ends 18, 28, 38 of the tong members. However, the position of the slot may vary depending on the desired operation of the utensil.

Figure 5:
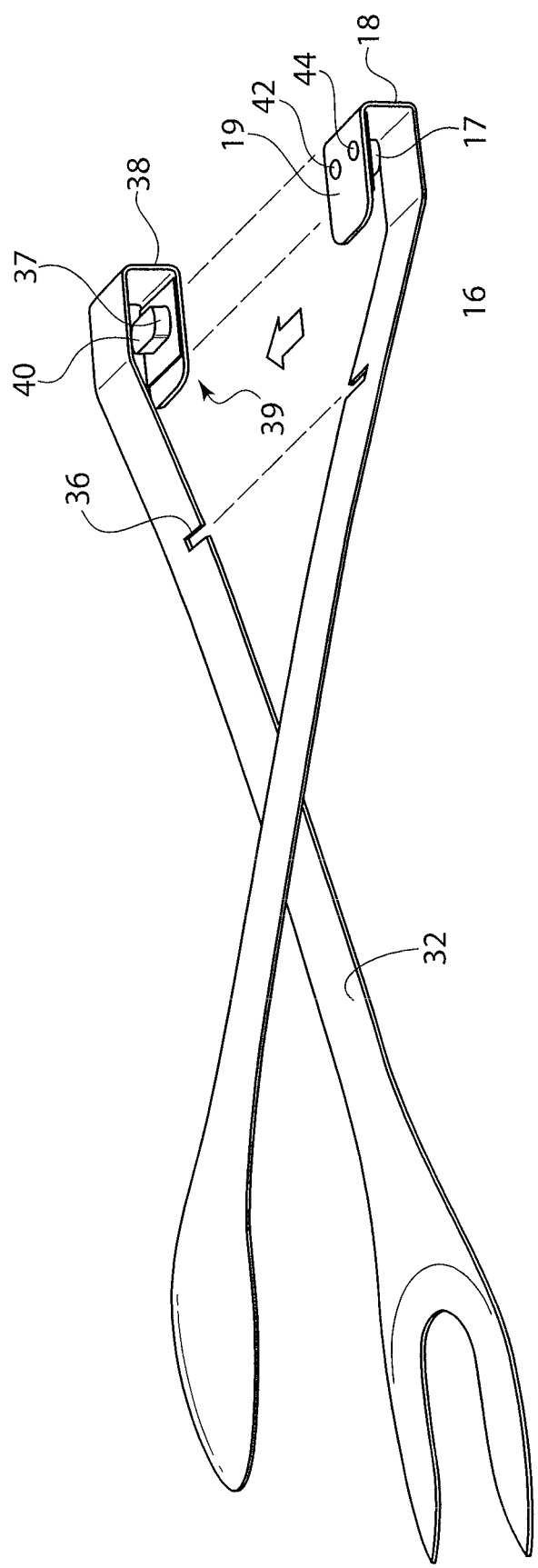
FIG. 5 shows an exploded view of first and third discrete tong members.

As shown in FIG. 5, the slots 16, 26, 36 of the first, second, and third tong members are configured to receive a slot of another tong member. The slots 16, 26, 36 are generally rectangular slots which have a length approximately half of the width of the tong member body. However, the slots may have a variety of lengths and shapes.

For example, as shown in FIG. 5, when the slot 16 of the first tong member receives the slot 36 of the third tong member 32 the first and third tong members 12, 32 are positioned in a conjoined relationship with each other. The releasable fastening means 17, 37 are then configured to fasten the tong members to each other in a secure manner in order to interlock the tong members to each other.

In the embodiments shown in FIGS. 1-5 the releasable fastening means comprise magnetic bodies 17, 27, 37 having a polarity whereby when the backside of the walls that the magnetic bodies are affixed to are placed adjacent to each other, the magnetic bodies exhibit an attraction to each other and are securely held in an adjacent relationship. In a preferred embodiment, each tong member 12, 22, 32 has a magnetic body 40 which has both a positive pole and a negative pole on different portions of the same contacting surface. For instance, as shown in FIG. 5, the magnetic body 40 has a positive pole 42 and a negative pole 44 which extend through the backside of the wall that the magnetic body is affixed to. The backside of the wall has apertures to receive the positive and negative poles 42, 44 of the magnetic body 40 so that the poles extend through the apertures and form a generally planar surface with the contacting surface. The dual polarity of the contacting surface of the magnetic body allows the tong members to connect to any other magnetic body on a tong member irrespective of the polarity of the magnetic body.

The backside of the walls may be generally planar as shown in FIGS. 1-5. Furthermore, the proximal ends may be comprised of three perpendicular walls forming a U-shape. In this configuration, the walls protect the magnet from damage. Furthermore, the open side formed by the U-shaped walls of the proximal ends of the tong members allows the U-shaped walls to serve as a hook so that the tong members can be easily hung when not in use.

The portion of the tong members from the slot to an area proximate to or at the distal end 14, 24, 34 are fabricated of a flexible, resilient material. These materials may include, either in whole or in combination, metal, thermoplastics, wood, wood-based materials and other materials well known in the art. In one embodiment, the tong members are fabricated of bamboo wood. In certain embodiments, the entire body of the tong members is fabricated of the flexible, resilient material.

As shown in FIG. 1, the conjoined and fastened first and second tong members 12, 22 form an interlocked utensil having a fulcrum at the conjoined slots. The flexible, resilient portions of the tong members from the fulcrum to the distal ends 14, 24 allows these portions of the first and second tong members to be urged towards each other in order for the gripping surfaces of the tong members to pick up articles of food. The user may grip the tongs near the fulcrum and easily pinch the tong members together in order to bring the grabbing surfaces of the first and second tong members towards each other, up to the point of contact, in order to grab food items. When the pressure is released by the user, the resilient material of the tong members causes the tong members to return to original initial position. A frictional surface may be included in the region near the fulcrum to aid the user in manipulating the interlocked tongs.

In the embodiment shown in FIG. 1, the arms extend outwardly at an approximate 20 degree radius from each other. However, the radius that the tong members extend from each other may be adjusted by changing the length of the proximal walls to increase or decrease the angle that the tong members extend about the fulcrum when the releasable fastening means secure the proximal ends to each other. Alternatively, a magnetic body having a specific thickness may be placed between the magnetic fasteners in order to increase the angle when the releasable fastening means secure the proximal ends to each other.

The tong members can be easily interchanged by releasing the releasable fastening means. For example, in the embodiment shown in FIG. 1 the releasable fastening means are released by pulling the magnetic bodies 17, 27 apart from each other. The second tong member 22 can easily be removed and the first tong member is configured to receive the slot of a new tong member in its slot 16 in order to conjoin the tong members and the tong members are configured to be fastened to each other.

The plurality of tong members preferably have a variety of gripping portions to allow the user to remove a tong member with a first gripping surface and replace it with another tong member having a different gripping surface in order to vary the gripping surfaces of the interlocked pair of tongs. Additionally, the discrete tong members may be easily released from the interlocked pair of tongs and used separately such as to stir or toss the food articles.

The interlocked pair of tongs 10 does not require a spring, or pivot hardware which reduces the risk of mechanical failure and adds to the attractiveness of the tongs.

While the application focuses on use of the conjoined, fastened pair of tongs for use in the preparation or serving of food, this use is illustrative only, and the tongs may be used for other purposes including as a tool for mechanical repair, electronics, for use with fire, etc.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed is:

1. An interchangeable kitchen utensil comprising:
   A plurality of discrete tong members;
   said tong members comprising a generally elongate body having a distal end which includes a gripping surface and a proximate end which includes releasable fastening means;
   said tong members having a slot between the proximal end and distal end;
   wherein each slot of the tong members is configured to receive a slot of another tong member in order to conjoin the slots of the first and second tong members;
   said releasable fastening means is configured to releasably secure the proximal ends of the first and a second tong member to each other in an adjacent relationship and in direct contact with each other when the tong members are received in their slots;
   wherein the conjoined and fastened first and second tong members form an interlocked utensil having a fulcrum at the conjoined slots and the portions of the first and second tong members between the slot and the gripping portion are configured to be urged towards each other in order for the gripping surfaces of the tong member to grasp various food articles.

2. The kitchen utensil of claim 1 wherein the portions of the first and second tong members of the interlocked utensil between the slot and the gripping portion are fabricated from a flexible, resilient material configured to be easily urged towards each other by application of pressure by the user in order for the gripping surfaces of the tong member to grasp various food articles and return to its initial position when the user releases pressure.

3. The kitchen utensil of claim 2 wherein the tong members are fabricated of metal.

4. The kitchen utensil of claim 2 wherein the tong members are fabricated of a thermoplastic material.

5. The kitchen utensil of claim 2 wherein the tong members are fabricated of wood.

6. The kitchen utensil of claim 5 wherein the tong members are fabricated of bamboo.

7. The kitchen utensil of claim 1 wherein the fastening means comprises magnetic fasteners.

8. The kitchen utensil of claim 7 wherein each magnetic fastener is configured to provide a positive pole and a negative pole on different portions of a contacting surface on the proximate end of the tong member, said contacting surface being configured for contacting the contacting surface of another tong member.

9. The kitchen utensil of claim 1 wherein the gripping surface of each tong members have a body that is chosen from a group comprising a spoon-like body, spatula-like body, or a fork-like body.

10. The kitchen utensil of claim 1 wherein the distal ends of the tong members have generally U-shaped walls.

11. An interchangeable kitchen utensil comprising:
A plurality of discrete tong members;
said tong members comprising a generally elongate body having a distal end which includes a gripping surface and a proximate end which includes releasable fastening means;
said tong members having a slot between the proximal end and distal end;
wherein each slot of the tong members is configured to receive a slot of another tong member in order to conjoin the slots of the first and second tong members;
said releasable fastening means are configured to releasably secure the proximal ends of the first and a second tong member to each other when the tong members are received in their slots;
wherein the conjoined and fastened first and second tong members form an interlocked utensil having a fulcrum at the conjoined slots and the portions of the first and second tong members between the slot and the gripping portion are configured to be urged towards each other in order for the gripping surfaces of the tong member to grasp various food articles; and
wherein the releasable fastening means comprises magnetic fasteners and each magnetic fastener is configured to provide a positive pole and a negative pole on different portions of a contacting surface on the proximate end of the tong member, said contacting surface being configured for contacting the contacting surface of another tong member.

* * * * *